United States Patent [19]

Hirata et al.

[11] Patent Number: 5,148,043
[45] Date of Patent: Sep. 15, 1992

[54] UNINTERRUPTIBLE POWER SUPPLY DIAGNOSING REMAINING BATTERY CAPACITY DURING NORMAL EXTERNAL POWER SOURCE OPERATION

[75] Inventors: Akio Hirata, Fuchu; Yoshiaki Miyazawa, Hachioji; Michiro Yamazaki, Fuchu, all of Japan

[73] Assignee: Kabushiki Kaisha Toshiba, Kawasaki, Japan

[21] Appl. No.: 555,762

[22] Filed: Jul. 23, 1990

[30] Foreign Application Priority Data

Jul. 25, 1989 [JP] Japan .................................. 1-191840
Sep. 29, 1989 [JP] Japan .................................. 1-252152

[51] Int. Cl.$^5$ .......................... H02J 7/04; H02J 9/06
[52] U.S. Cl. ...................................... 307/66; 307/46; 320/32
[58] Field of Search ............... 320/32, 14, 13; 307/64, 307/66, 82, 85-87, 44-46, 48; 364/273.4; 324/427, 433

[56] References Cited

U.S. PATENT DOCUMENTS

| 4,032,828 | 6/1977 | Strobl et al. | 320/39 |
| 4,340,823 | 7/1982 | Miyazawa | 307/66 |
| 4,611,289 | 9/1986 | Coppola | 364/492 |
| 4,641,042 | 2/1987 | Miyazawa | 307/66 |
| 4,673,826 | 6/1987 | Masson | 307/66 |
| 4,733,341 | 3/1988 | Miyazawa | 307/82 |
| 4,820,966 | 4/1989 | Fridman | 320/32 |
| 5,025,202 | 6/1991 | Ishii et al. | 320/32 |
| 5,061,898 | 11/1991 | Oram et al. | 320/13 |

Primary Examiner—A. D. Pellinen
Assistant Examiner—Richard Elms
Attorney, Agent, or Firm—Oblon, Spivak, McClelland, Maier & Neustadt

[57] ABSTRACT

A power supply is energized by an external power source and a battery, and supplies electric power to a load. The power supply includes a battery voltage detector and a current detector for detecting a discharge current from the battery. The remaining capacity of the battery is detected in accordance with a change in the battery voltage when the external power source is free of power failure. The battery voltage change is defined as the difference between an initial voltage of the battery and an active voltage of the battery obtained when the battery is discharged by the detected discharge current for a predetermined period of time.

17 Claims, 9 Drawing Sheets

UNINTERRUPTIBLE POWER SUPPLY DIAGNOSING REMAINING BATTERY CAPACITY DURING NORMAL EXTERNAL POWER SOURCE OPERATION

BACKGROUND OF THE INVENTION

1. Field of the Invention

The present invention relates to a power supply apparatus capable of supplying stable output power when an input AC power supply fails for a short period of time and, more particularly, to a power supply apparatus having a function of diagnosing the capacity of a storage battery when the storage battery is used as part of the power supply apparatus.

2. Description of the Related Art

Uninterruptible power supply apparatuses are disclosed in various literatures such as Toshiba Review Vol. 42, No. 11 (November, 1987) PP. 877–880. Therefore, the functions and outlines of operations of the apparatuses are known. These known techniques will be summarized below.

An uninterruptible power supply apparatus constituted by a combination of a storage battery and an inverter unit is designed to supply stable AC power to a load for a predetermined period of time (e.g., 10 or 30 minutes) determined by the capacity of the storage battery even if the input AC power supply fails for a short period of time.

If an input AC power supply is assumed to fail for a long period of time or a load is a computer used for the benefit of the public, an independent power plant may be provided as backup equipment so that the independent power plant and the input AC power supply are switched to cause the independent power plant to supply AC power to the load through the inverter unit. During this power supply switching period, power supply to the load must be ensured by means of a storage battery.

As described above, the uninterruptible power supply apparatuses can continuously supply stable AC power to a load for a predetermined power failure time. Therefore, they are increasingly used as power supply apparatuses for loads requiring high reliability, such as large scale computers.

The backup time, however, upon a power failure of an input AC power supply in an uninterruptible power supply apparatus is determined by the capacity of a storage battery. The capacity of the storage battery is initially selected depending on a system capacity (the load capacity of the uninterruptible power supply apparatus). However, the storage battery tends to be degraded in characteristics over time, and is changed in discharging capacity depending on an operation temperature and the like.

In the conventional uninterruptible power supply apparatus, therefore, whether the storage battery can cover a power failure backup time required by a system is determined by causing the storage battery to discharge when the input AC power supply actually fails. For this reason, a downward tendency of the capacity of the storage battery cannot be detected unless a shortage of a power failure backup time actually occurs. In addition, if such a trouble occurs, this causes a lot of inconvenience to many and unspecified users of the load (computer system) (e.g., interruption of an online system in a bank or interruption of operations at a counter of an air line). That is, the drawback of the conventional power supply apparatus as a power supply apparatus requiring high reliability is that the user is always attacked by an indefinite inquietude.

SUMMARY OF THE INVENTION

The present invention has been made in consideration of the drawback of the conventional power supply apparatus, and has as its object to provide a power supply apparatus which can diagnose the capacity of a storage battery while an input AC power supply is normally operated.

In order to diagnose the capacity of the storage battery, the present invention includes a circuit for monitoring a discharging current from the storage battery and a voltage change during a discharging operation. While the input AC power supply is normally operated, a rectifier of an inverter unit is stopped for a predetermined period of time, and only the storage battery or both the rectifier and the storage battery is or are used to supply power to a load, thus causing the storage battery to discharge. A discharging current from the storage battery and a voltage change during this discharging operation are monitored, and the capacity of the storage battery is diagnosed on the basis of the relationship between the discharging amount and the voltage change.

If, for example, the capacity of the storage battery is periodically diagnosed by the above-described method while the input AC power supply is normally operated, a capacity change of the storage battery due to an operation temperature or degradation of characteristics over time can be detected prior to an actual power failure of the input AC power supply.

The capacity of the storage battery is generally defined by "discharging current x discharging time (Ah)". If, therefore, the storage battery is discharged for a predetermined period of time, and a discharging amount Ah and the voltage of the storage battery during this period are monitored, the proportion of the remaining capacity of the storage battery to the initial design value can be detected on the basis of a known relationship between the remaining capacity determined by the type of storage battery and the battery voltage. That is, the capacity of the storage battery can be diagnosed by the relationship between the discharging amount and the remaining capacity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
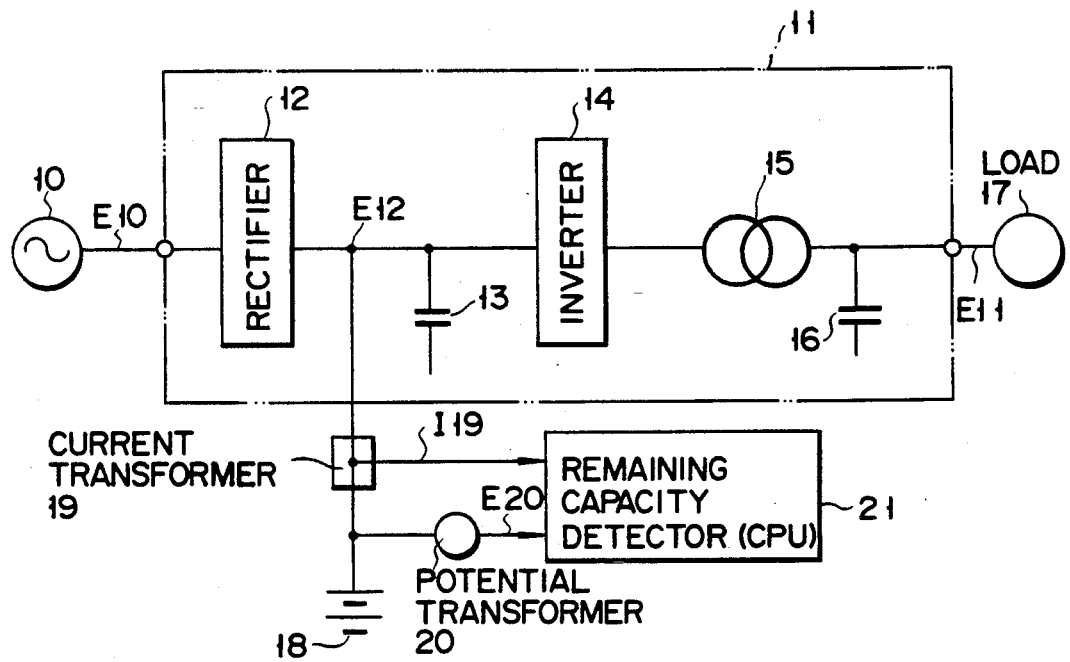
FIG. 1 is a block diagram showing an arrangement of a power supply apparatus according to an embodiment of the present invention.

FIG. 1 shows an embodiment of the present invention.

Referring to FIG. 1, reference numeral 10 denotes an input AC power supply; 11, an inverter unit; 12, rectifier; 13, a DC filter capacitor; 14, an inverter; 15, an inverter transformer; 16, an AC filter capacitor; 17, a load; 18, a storage battery; 19, a current detector; 20, a voltage detector; and 21, a remaining capacity detector.

In the arrangement shown in FIG. 1, when input AC power supply 10 is in a normal state, AC power is converted into DC power by rectifier 12 in inverter unit 11, and the DC power is smoothed by DC filter capacitor 13 and is supplied to inverter 14 while a charging current is supplied to storage battery 18. Inverter 14 converts the smoothed DC power into AC power and supplies it to load 17 through inverter transformer 15. At this time, the voltage and frequency of the AC power to be supplied to load 17 are controlled to be predetermined values by inverter 14 using known PWM control, thus supplying stable AC power. AC filter capacitor 16 is provided as a ripple filter for the AC power supplied at this time.

When input AC power supply 10 fails for a short period of time, DC power is supplied from storage battery 18, and stable AC power can be supplied to load 17 through inverter 14 in the same manner as described above. With the above-described operation, the uninterruptible power supply apparatus constituted by the combination of storage battery 18 and inverter unit 11 can supply stable AC power to load 17 for a predetermined period of time (e.g., 10 or 30 minutes) determined by the capacity of storage battery 18 even if input AC power supply 10 fails for a short period of time.

Referring to FIG. 1, while AC power is supplied from input AC power supply 10 to load 17 through inverter unit 11, rectifier 12 is stopped for a predetermined period of time, and the charge of storage battery 18 is supplied to load 17 through inverter 14 in order to check the capacity of storage battery 18.

Figure 2A:
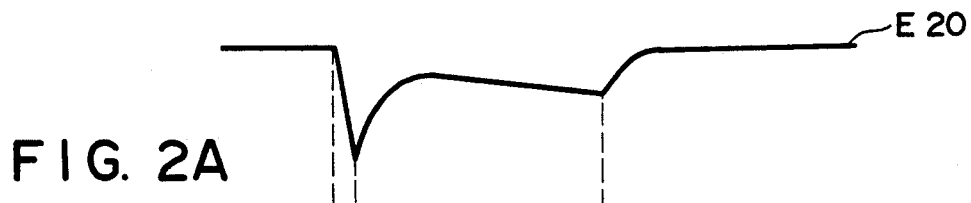
FIGS. 2A and 2B are graphs for explaining an operation of the power supply apparatus in FIG. 1.
Figure 2B:
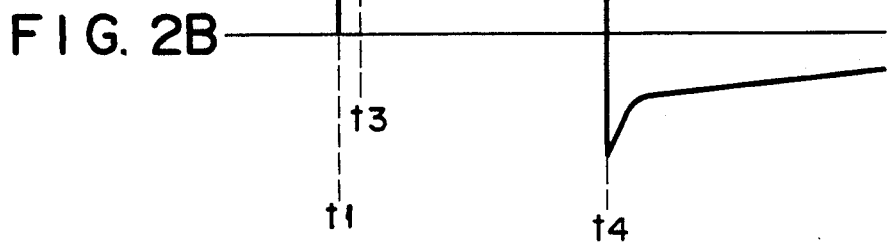

FIGS. 2A and 2B show a discharging current and voltage from storage battery 18 at this time. FIG. 2A shows voltage E20 of storage battery 18. FIG. 2B shows discharging current I19. Rectifier 12 is stopped at time t1, and is started again at time t4. Voltage E20 of storage battery 18 is abruptly decreased from time t1 to time t3 due to the internal impedance, but is gradually restored to the original level. As storage battery 18 discharges, voltage E20 of storage battery 18 changes as shown in FIG. 2A as a whole.

Discharging current I19 (shown in FIG. 2B) from storage battery 18 is detected by current detector 19 and is input to remaining capacity detector 21. In addition, voltage E20 is detected by voltage detector 20 and is input to remaining capacity detector 21. Remaining capacity detector 21 detects the discharging amount from storage battery 18 from time t1 to time t4 in units of Ampere Hour (Ah). The capacity of storage battery 18 can be easily checked by comparing the initially designed voltage of storage battery 18 with the voltage detected by voltage detector 20 at time t4 during this Ah-unit discharge.

The remaining capacity of storage battery 18 after the above-mentioned predetermined Ah-unit discharge can be calculated on the basis of a change in battery voltage E20 in accordance with the type of storage battery. More specifically, if a relationship between a discharging amount and a voltage change is calculated by remaining capacity detector 21, the precise remaining capacity of storage battery 18 can be detected, and a decrease in capacity of storage battery 18 due to degradation of quality over time or an installation environment can be detected.

The above-mentioned remaining capacity detection can be easily performed by using a microcomputer or the like. The capacity of storage battery 18 may be more simply detected in the following manner. A capacity decrease with respect to the initial design value of storage battery 18 ca be determined by only comparing the initially designed voltage (storage battery 18 is new) with a detection voltage (storage battery is not new) at time t4 while the time interval between time t1 and time t4 in FIG. 2 is fixed (e.g., 10 minutes) and discharging is performed in this time interval.

Storage battery 18 is an important constituent element of the uninterruptible power supply apparatus. If the capacity of storage battery 18 does not correspond to the initial design value, stable power cannot be supplied to load 17 for a predetermined period of time upon a power failure of input AC power supply 10. However, with the apparatus shown in FIG. 1, the capacity of storage battery 18 can be diagnosed while input AC power supply 10 is normally operated. Therefore, storage battery 18 can be repaired or replaced in advance in accordance with timely periodic inspection, and a highly reliable uninterruptible power supply apparatus can be provided.

Figure 3:
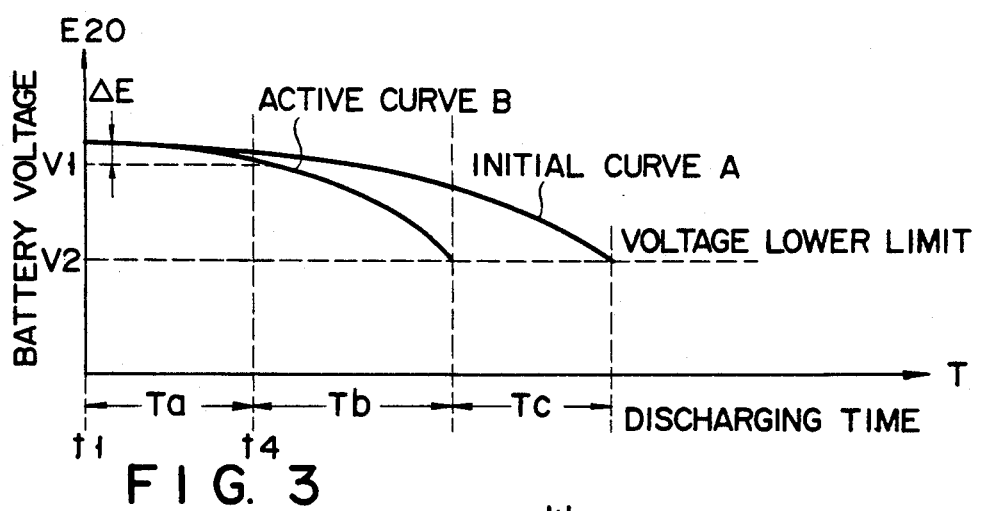
FIGS. 3 to 5 are graphs for explaining a manner of diagnosing the discharging capacity of a storage battery in the power supply apparatus of the present invention.
Figure 4:
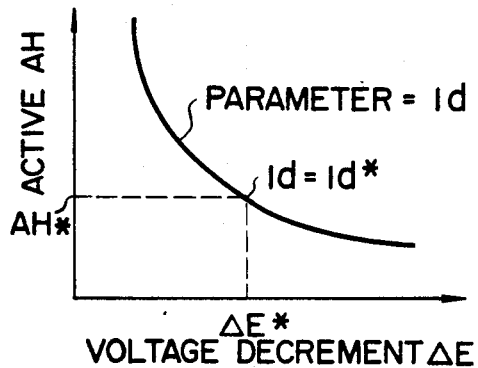
Figure 5:
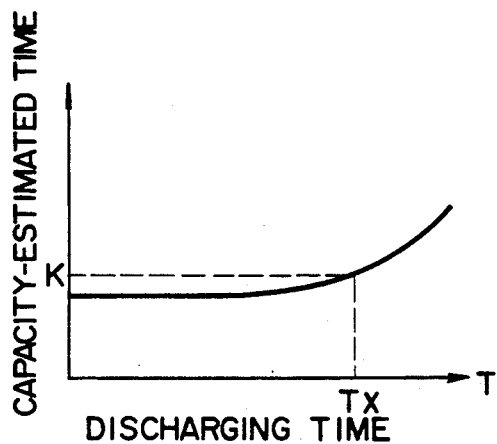

FIGS. 3 to 5 are graphs for explaining a manner of diagnosing the discharging capacity of a storage battery in the power supply apparatus in FIG. 1.

When storage battery 18 is new, a change in electromotive force E20 as a function of a discharging time with discharging current Id being used as a parameter is given as a curve A in FIG. 3 (the power supply duration during which electromotive force E20 reaches voltage lower limit V2 is given by Ta+Tb+Tc). When the capacity of storage battery 18 is decreased due to aging or the like, the actual electromotive force change curve at this time is given as a curve B in FIG. 3 (the power supply duration is given by Ta+Tb).

When storage battery 18 is new, the remaining capacity at time t4 in FIG. 3 corresponds to Tb+Tc in terms of power supply duration. However, then storage battery 18 is degraded, the remaining capacity at time t4 corresponds to Tb.

Such a decrease in remaining capacity can be determined from a voltage decrement $\Delta E$ detected at a time (t4) when a predetermined short period of time Ta (e.g., 10 minutes) has elapsed after discharging is started (t1), without discharging storage battery 18 until electromotive force E20 is lowered from initial voltage V1 to voltage lower limit V2.

Figure 6:
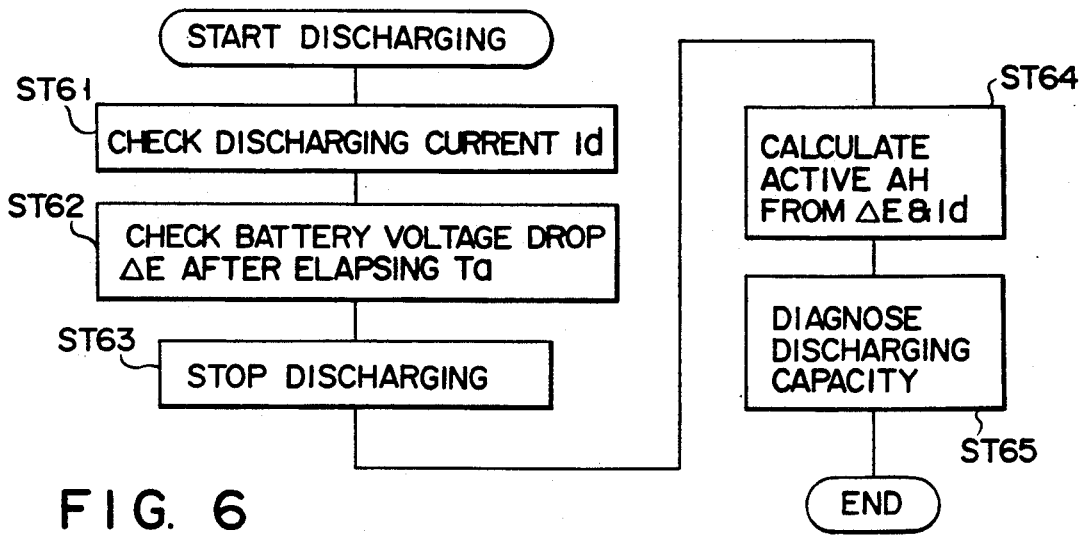
FIG. 6 is a flow chart for explaining a manner of diagnosing the discharging capacity of the storage battery in the power supply apparatus of the present invention.

FIG. 6 is a flow chart for explaining the above-mentioned determination, i.e., a manner of diagnosing the discharging capacity of storage battery 18 by means of remaining capacity detector 21.

Discharging of storage battery 18 is started with a predetermined discharging current (Id) at time t1 in FIG. 3. It is checked whether the discharging current (Id) at this time is kept at a predetermined value (ST61).

When a predetermined period of time (Ta) has elapsed (t4) after discharging of the predetermined current is started, storage battery voltage decrement $\Delta E$ (=V1−E20) is calculated from electromotive force E20 at this time and discharge initial value V1 (ST62). When voltage decrement $\Delta E$ is obtained, the discharging operation is stopped (ST63).

A relationship between voltage decrement $\Delta E$ and active remaining capacity AH established when the discharging current (Id) at voltage decrement $\Delta E$ is used as a parameter can be experimentally obtained in advance for each storage battery 18 (various data obtained when AH is given by a function f($\Delta E$,Id) are stored in a data base). The relationship between $\Delta E$ and AH is represented by, e.g., a curve in FIG. 4.

If discharging current Id (=Id*) checked in step ST61 in FIG. 6 and voltage decrement $\Delta E$ (=$\Delta E$*) checked in step ST62 are applied to the graph in FIG. 4, currently checked active remaining capacity AH (=AH*) can be estimated (ST 64).

If active remaining capacity AH is divided by discharging current IL corresponding to an actual load capacity as indicated by the following equation (1) capacity-estimated time (capacity coefficient) K is obtained:

$$K=AH/IL \tag{1}$$

If, for example, AH=10 (ampere hour) and IL=20 (amperes), K is 0.5 hours (30 minutes).

If a relationship between capacity-estimated time K and discharging time T shown in FIG. 5 is obtained in advance for each type of storage battery 18, actual discharging enable time (power failure backup time) Tx of checked storage battery 18 can be obtained from the value of K obtained by equation (1). The capacity of storage battery 18 can be diagnosed on the basis of Tx (ST65).

Figure 7:
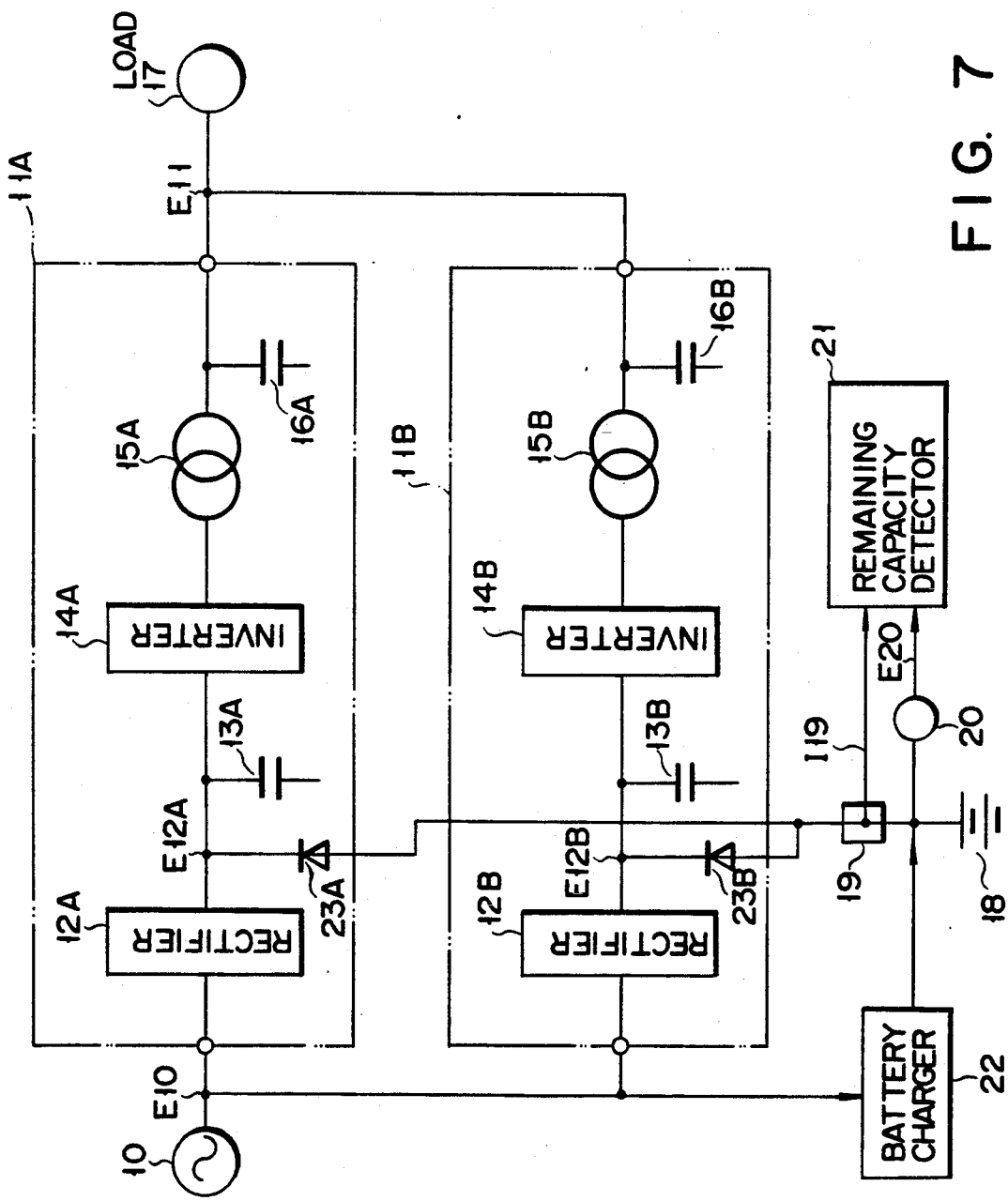
FIG. 7 is a block diagram showing an arrangement of a power supply apparatus according to the second embodiment of the present invention.

FIG. 7 shows another embodiment of the present invention. Referring to FIG. 7, reference numeral 22 denotes a battery charger for storage battery 18; and 23A and 23B, diodes. Since other circuit constituent elements in FIG. 7 are identical to those in FIG. 1, a description thereof will be omitted. Referring to FIG. 7, two inverter units 11A and 11B are connected to input AC power supply 10, and the output terminals of inverter units 11A and 11B are connected in parallel to load 17 so as to supply stable power thereto. Storage battery 18 is commonly arranged for two inverter units 11A and 11B. Special battery charger 22 is arranged for storage battery 18, and diodes 23A and 23B are additionally provided to prevent interference between rectifiers 12A and 12B of inverter units 11A and 11B.

In the uninterruptible power supply apparatus having the arrangement shown in FIG. 7, when the capacity of storage battery 18 is to be diagnosed, two rectifiers 12A and 12B may be simultaneously stopped, or only one of rectifiers 12A and 12B may be stopped.

According to the present invention, when input AC power supply 10 is set in a normal state, the capacity of storage battery 18 is diagnosed by supplying part of power to be supplied to load 17 from storage battery 18. However, it is to be noted that only one of rectifiers 12A and 12B may be stopped or both of them may be simultaneously stopped.

In the embodiments described with reference to FIGS. 1 and 7, rectifier 12 is stopped, and storage battery 18 is discharged. However, the same effect as described above can be obtained even if storage battery 18 and rectifier 12 are operated in parallel, and at least part of power to be supplied to load 17 is supplied from storage battery 18 so as to detect the remaining capacity of storage battery 18 by using remaining capacity detector 21.

Figure 8:
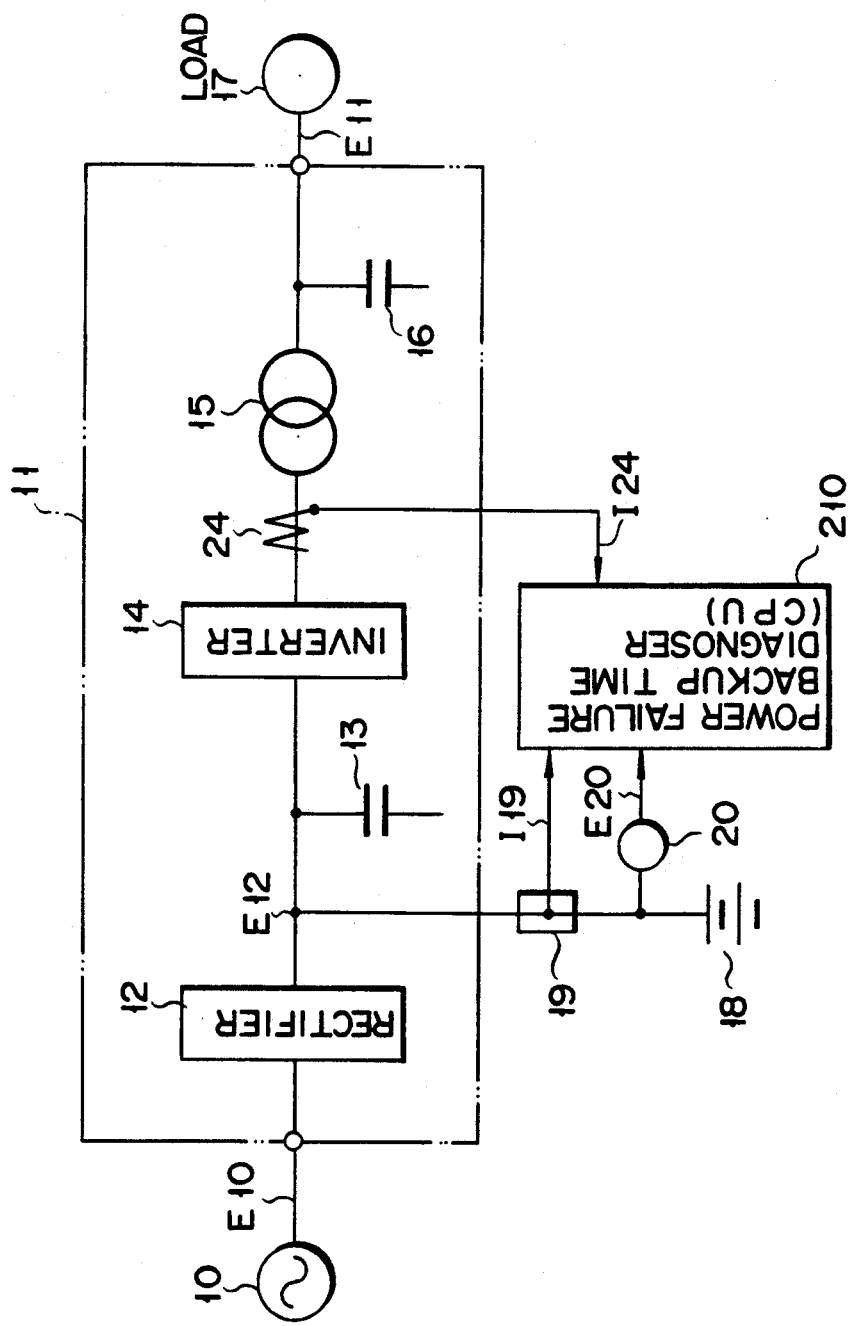
FIG. 8 is a block diagram showing an arrangement of a power supply apparatus according to the third embodiment of the present invention.

FIG. 8 shows still another embodiment of the present invention. The same reference numerals in FIG. 8 denote the same circuit constituent elements as in FIG. 1, and a description thereof will be omitted.

Referring to FIG. 8, reference numeral 210 denotes a power failure backup time diagnoser for diagnosing the capacity of storage battery 18 on the basis of outputs from current detector 19 and voltage detector 20. In addition, diagnoser 210 detects power failure backup time Tx on the basis of output signal I24 from current detector 24 for detecting an initially designed load capacity or the actual capacity of load 17. While AC power is supplied from input AC power supply 10 to load 17 through inverter unit 11, rectifier 12 is stopped for a predetermined period of time, and the charge of storage battery 18 is supplied to load 17 through inverter 14 in order to check the capacity of storage battery 18. FIGS. 2A and 2B respectively show the discharging current and voltage of the storage battery at this time.

Discharging current I19 (FIG. 2B) from storage battery 18 is detected by current detector 19 and is input to power failure backup time diagnoser 210. Voltage E20 from storage battery 18 is detected by voltage detector 20 and is also input to power failure backup time diagnoser 210. Power failure backup time diagnoser 210 detects the discharging amount from storage battery 18 from time t1 to time t4 in units of Ah. The capacity of storage battery 18 can be easily determined by comparing the initially designed voltage of storage battery 18 with a voltage detected by voltage detector 20 at time t4 during this Ah-unit discharge.

When the capacity of storage battery 18 is diagnosed, power failure backup time Tx of storage battery 18 can be calculated with respect to the capacity of load 17 which is determined at the time of diagnosis on the basis of the initially designed load capacity or output I19 (or I24) from current detector 19 (or 24). Time Tx may be calculated by the same method as described with reference to FIGS. 3 to 6. Generally, the load amount of an uninterruptible power supply apparatus is often unknown to a user of load 17, such as a large scale computer or its peripheral unit. However, as in the present invention, if the power failure backup time of an actually operated apparatus is diagnosed, whether a required uninterruptible power supply function can be ensured or not can be easily comprehended by a user.

Figure 9:
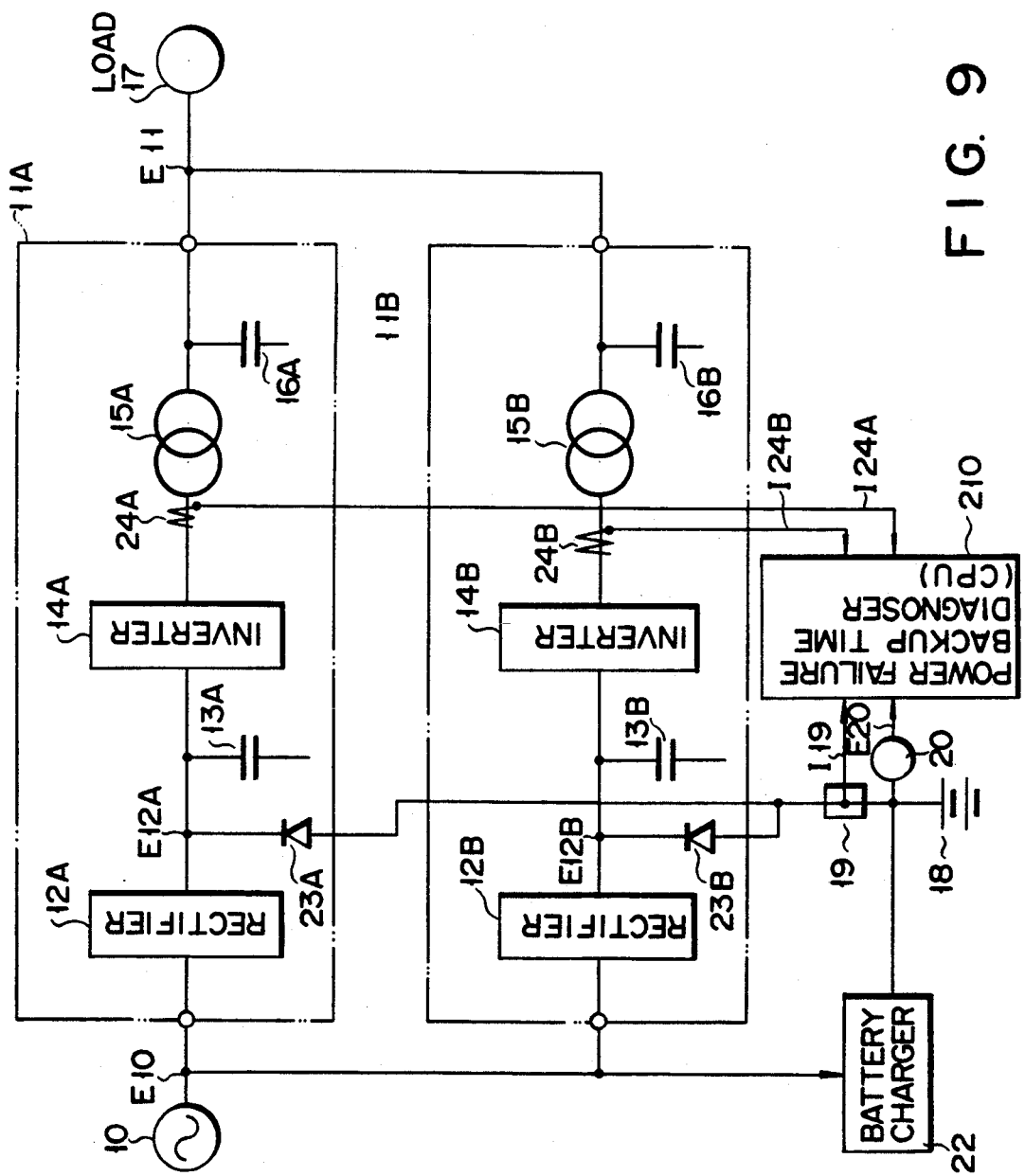
FIG. 9 is a block diagram showing an arrangement of a power supply apparatus according to the fourth embodiment of the present invention.

FIG. 9 shows still another embodiment of the present invention. Referring to FIG. 9, reference numeral 22 denotes a battery charger for storage battery 18; and 23A and 23B, diodes. Other circuit elements in FIG. 9 are the same as those in FIG. 8, and a description thereof will be omitted.

In the uninterruptible power supply apparatus having the arrangement shown in FIG. 9, when the capacity of storage battery 18 is to be diagnosed, two rectifiers 12A and 12B may be simultaneously stopped or only one of them may be stopped. According to the present invention, while input AC power supply 10 is in a normal state, part of power to be supplied to load 17 is supplied from storage battery 18 in order to diagnose the capacity of storage battery 18. Note that the power supplied to load 17 can be detected by outputs I24A and I24B from current detectors 24A and 24B.

Figure 10:
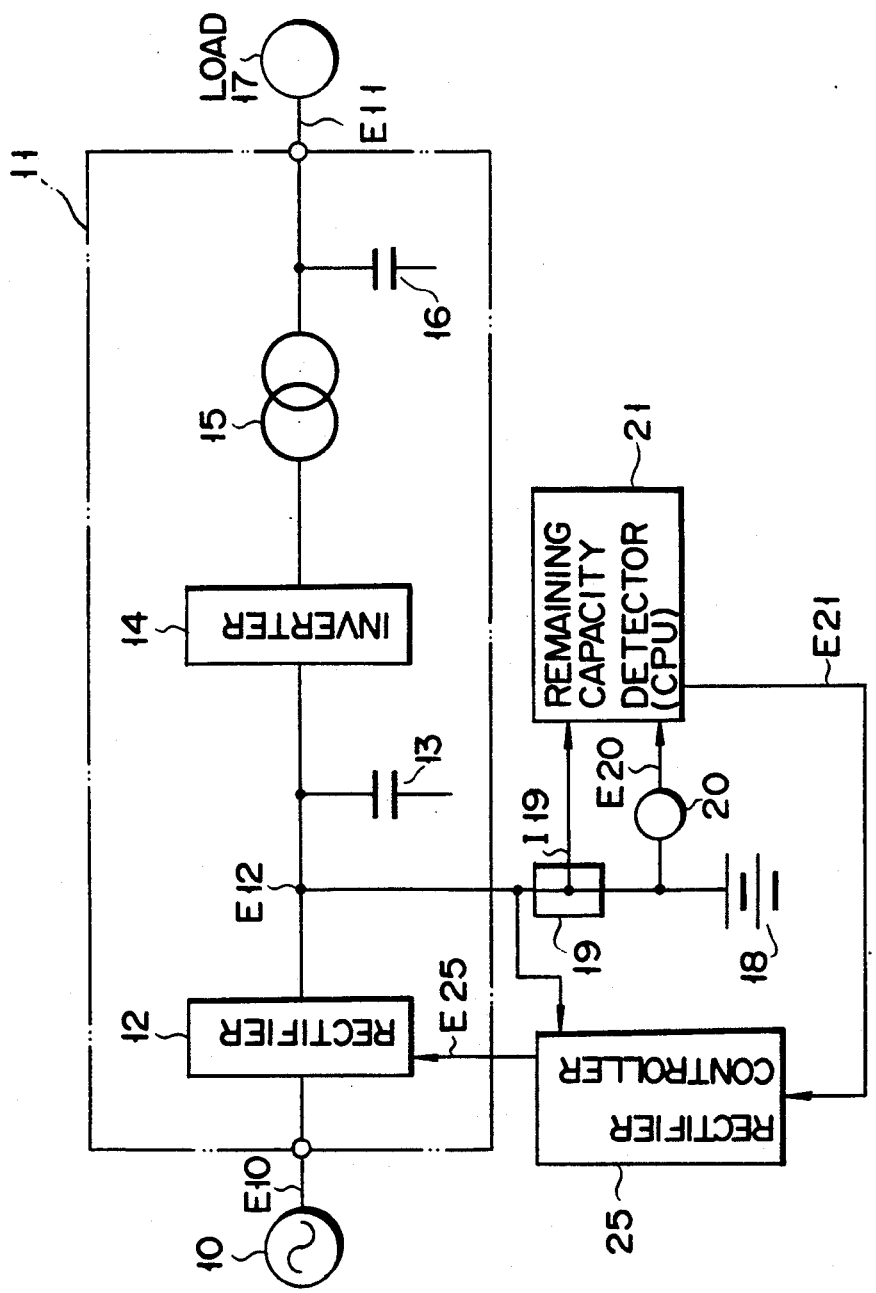
FIG. 10 is a block diagram showing an arrangement of a power supply apparatus according to the fifth embodiment of the present invention.

FIG. 10 shows still another embodiment of the present invention. The same reference numerals in FIG. 10 denote the same circuit constituent elements as in FIG. 1, and a description thereof will be omitted.

The backup capacity of storage battery 18 with respect to load 17 is diagnosed by the arrangement shown in FIG. 10. Rectifier 12 is controlled by rectifier controller 25 on the basis of this diagnosis result so as to automatically perform equalizing charging in accordance with the capacity of storage battery 18, thereby preventing a decrease in backup capacity of storage battery 18. When controller 25 in FIG. 10 has a function of controlling rectifier 12 to perform equalizing charging of storage battery 18 for a predetermined period of time and restoring the charge mode to a floating charge mode, the following operation can be performed.

Figure 11:
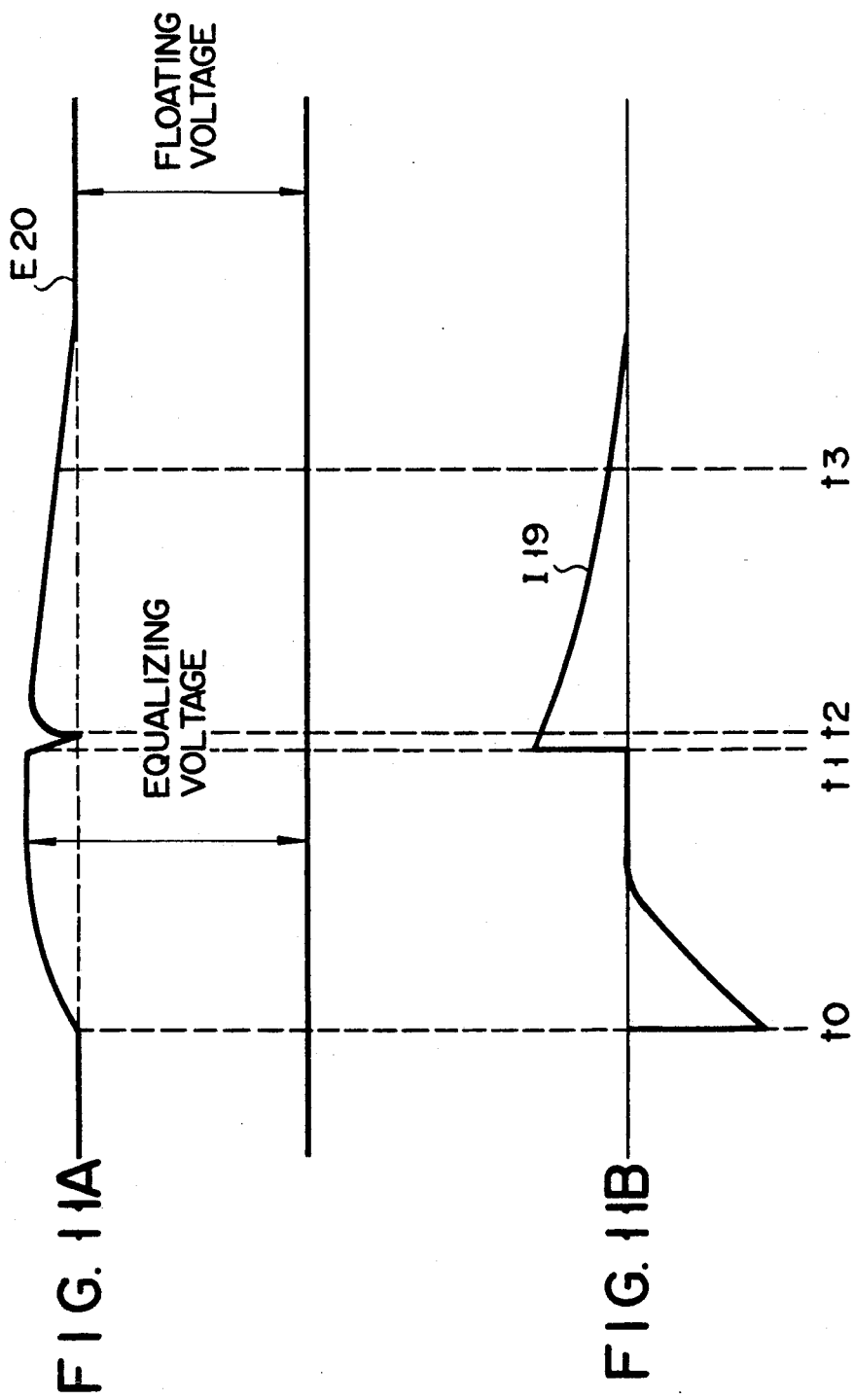
FIGS. 11A and 11B are graphs for explaining an operation of the power supply apparatus in FIG. 10.

In the uninterruptible power supply apparatus, while AC power is supplied from input AC power supply 10 to load 17 through inverter unit 11, in order to check the capacity of storage battery 18, rectifier 12 is controlled by controller 25 to perform the equalizing charge mode for a predetermined period of time, the charge mode is restored to the floating charge mode. At this time, the charge of storage battery 18 is supplied to load 17 through inverter 14. FIGS. 11A and 11B show discharging current I19 and voltage E20 of storage battery 18 at this time. FIG. 11A shows voltage E20 of storage battery 18. FIG. 11B shows discharging current I19.

Controller 25 starts the equalizing charge mode at time t0, and switches the charge mode to the floating charge mode at time t1. Voltage E20 of storage battery 18 is abruptly decreased from time t1 to time t2 due to the internal impedance. Thereafter (after time t2), voltage E20 is gradually restored to the original level. As storage battery 18 discharges, voltage E20 of storage battery 18 is decreased as indicated by FIG. 11A as a whole, and finally returns to the level of the floating voltage.

Discharging current I19 (shown in FIG. 11B) from storage battery 18 is detected by current detector 19 and is input to remaining capacity detector 21. In addition, voltage E20 is detected by voltage detector 20 and is input to remaining capacity detector 21.

Remaining capacity detector 21 detects the discharging amount from storage battery 18 from time t1 to desired time t3 in units of Ah. The capacity of storage battery 18 can be determined by comparing the initially designed voltage of storage battery 18 with the voltage detected by voltage detector 20 at time t3 during this Ah-unit discharge.

Figure 12:
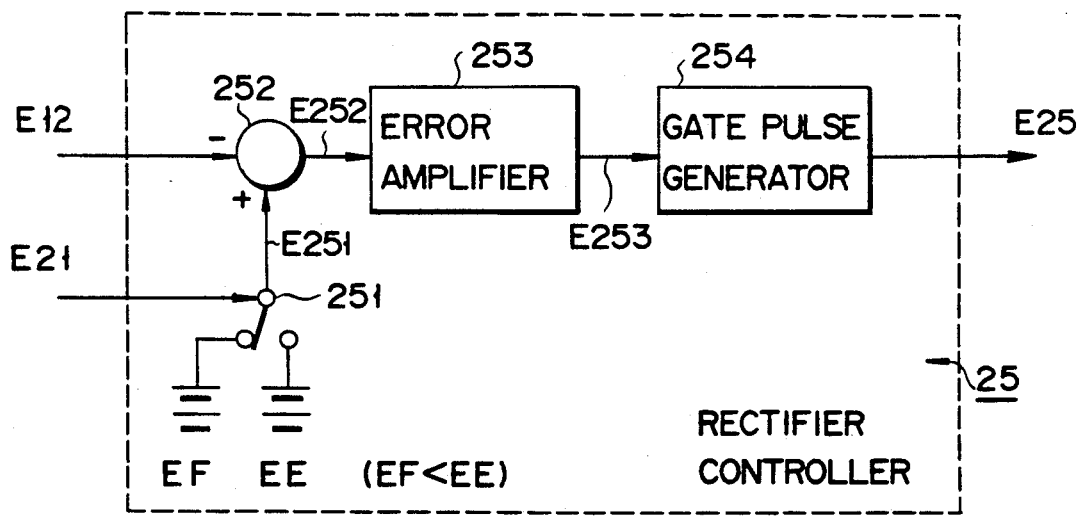
FIG. 12 is a block diagram showing an arrangement of a rectifier controller in the embodiment in FIG. 10.
Figure 13:
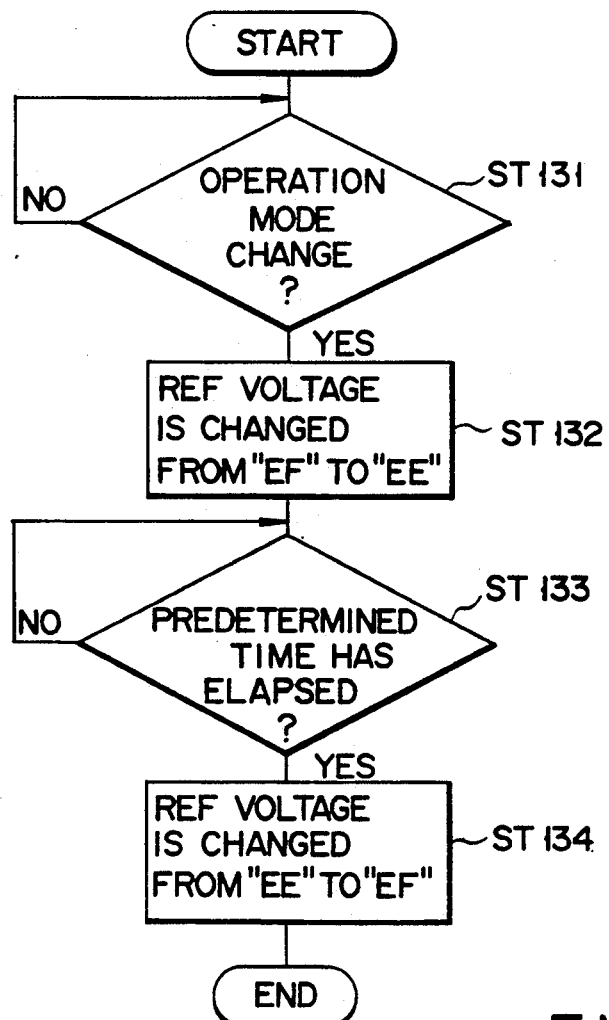
FIG. 13 is a flow chart for explaining an operation of the embodiment in FIG. 10.

FIG. 12 is a block diagram showing an arrangement of the rectifier controller in the embodiment shown in FIG. 10. FIG. 13 is a flow chart for explaining an operation of the embodiment shown in FIG. 10.

Detector 21 in FIG. 10 includes a comparator having a comparison voltage EEref corresponding to the equalizing voltage in FIG. 11A. The comparator of detector 21 compares voltage E20 of storage battery 18 with comparison voltage EEref, and generates comparison output E21 of logic "1" when E20>EEref (equalizing charge mode; YES in step ST131 in FIG. 13).

Comparison output E21 is supplied to electronic switch 251 in FIG. 12. Switch 215 selects reference voltage EE for equalizing charging when output E21 is at logic "1" (step ST132). Selected reference voltage E251 (=EE) is applied to comparator 252.

Comparator 252 compares input reference voltage E251 with output voltage E12 from rectifier 12. Error E252 obtained by this comparison is amplified by error amplifier 253 and is input to gate pulse generator 254. In accordance with input error signal E253, generator 254 ON/OFF-controls the thyristor in rectifier 12 so as to cause output voltage E12 from rectifier 12 to correspond to reference voltage EE for equalizing charging. With this operation, equalizing charging is performed for a predetermined time (t0 to t3 in FIG. 11A) (NO in step ST133).

When the predetermined time elapses (YES in step ST133), and E20<EEref, the comparator in detector 21 generates comparison output E21 of logic "0" (floating charge mode). Since output E21 is at logic "0", electronic switch 251 selects reference voltage EF for floating charging (step ST134). Selected reference voltage E251 (=EF) is input to comparator 252.

Comparator 252 compare input reference voltage E251 with a voltage corresponding to output voltage E12 from rectifier 12. In accordance with input error signal E253, gate pulse generator 254 ON/OFF-controls the thyristor in rectifier 12 so as to cause output voltage E12 from rectifier 12 to correspond to reference voltage EF for floating charging. With this operation, floating charging is performed after time t2 in FIG. 11A.

Figure 14:
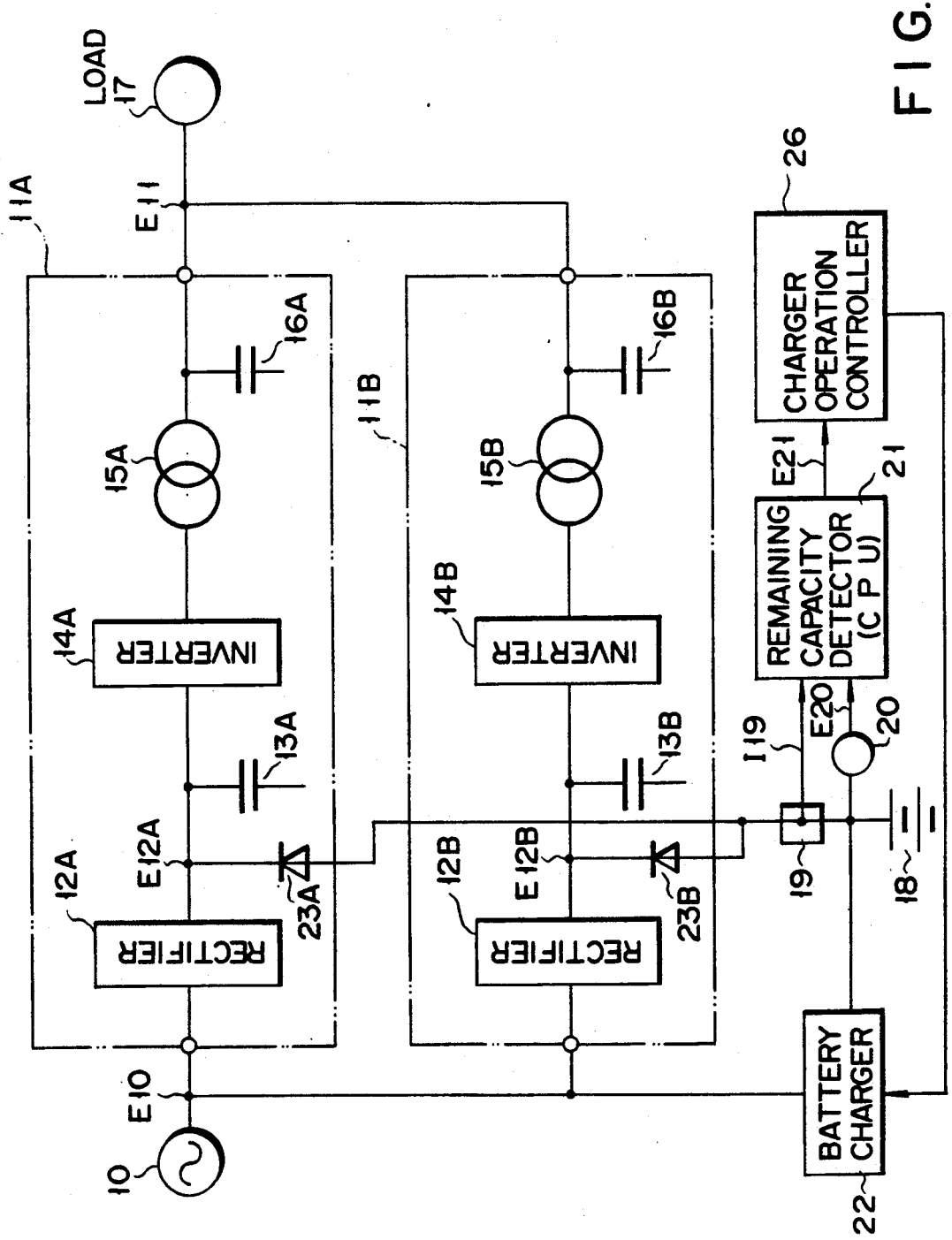
FIG. 14 is a block diagram showing an arrangement of a power supply apparatus according to the sixth embodiment of the present invention.

FIG. 14 shows still another embodiment of the present invention. Referring to FIG. 14, reference numeral 22 denotes a battery charger for storage battery 18; and 26, a charger operation controller of battery charger 22. Other circuit constituent elements in FIG. 14 are the same as those in FIG. 7, and a description thereof will be omitted.

In the uninterruptible power supply apparatus having the arrangement shown in FIG. 14, when the capacity of storage battery 18 is to be diagnosed, two rectifiers 12A and 12B may be simultaneously stopped or only one of them may be stopped. According to the present invention, while input AC power supply 10 is in a normal state, the capacity of storage battery 18 is diagnosed by causing storage battery 18 to supply part of power to be supplied to load 17. When detector 21 detects that voltage E20 of storage battery 18 is larger than the floating voltage (EFref) in FIG. 11A, controller 26 sets battery charger 22 in the equalizing charge mode in response to output E21 from detector 21. If voltage E20 corresponds to the floating voltage, controller 26 sets battery charger 22 in the floating charge mode.

Since the power supply apparatus for performing a backup operation by using the storage battery in this manner is used as an uninterruptible power supply apparatus to supply power to an important load, it is required to have high reliability. According to the present invention, it is apparent that the following effects can be provided:

(1) The capacity of a storage battery can be diagnosed in advance. Timely periodic inspection can be performed on the basis of this diagnosis result, and the storage battery can be repaired as needed. Therefore, the reliability of the power supply apparatus can be greatly increased.

(2) Capacity diagnosis of a storage battery can be periodically performed to detect the degradation tendency of the battery. In addition, since the capacity of the storage battery is diagnosed in advance, a user of the power supply apparatus need not take unnecessary precaution.

(3) Since the power failure back-up time of a load is diagnosed on the basis of the diagnosis result of a storage battery, a user can easily determine whether a required power failure back-up time is ensured, thus further increasing the reliability of the power supply apparatus.

(4) Since the capacity of a storage battery is diagnosed from characteristics detected when the floating charge mode is restored after equalizing charging is temporarily performed, the storage battery is not wasted upon discharging.

(5) Since the backup capacity of a storage battery with respect to a load is diagnosed, and equalizing charging is automatically performed, the backup capacity can be kept at a constant level. Therefore, power supply to a load can be reliably performed for a predetermined period of time during a power failure.

(6) Since equalizing charging is performed in accordance with the capacity diagnosis result of a storage battery, excessive or insufficient charging can be prevented. That is, charging can be efficiently performed.

Note that techniques associated with the present invention are disclosed in the following U.S. Patent publications:

(1) U.S. Pat. No. 4,340,823 issued on Jul. 20, 1982 (Miyazawa), "Uninterruptible Power Supply"

(2) U.S. Pat. No. 4,641,042 issued on Feb. 3, 1987 (Miyazawa), "Power Supply System and a Control Method thereof".

The contents disclosed in the above-mentioned U.S. Patent publications are incorporated in the specification of the present invention.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A power supply, which is energized by at least one of an external power source and a battery, and supplies electric power to a load, comprising:
   means for detecting a battery voltage generated by the battery;
   means for detecting an amount of electric charges discharged from the battery when the power supply is energized by the battery; and
   means for detecting a remaining capacity of the battery in accordance with a change in the battery voltage when the external power source is free of power failure;
   wherein said battery voltage change is a difference between an initial voltage of the battery and an active voltage of the battery obtained when the battery is discharged by a predetermined current for a predetermined period of time.

2. A power supply according to claim 1, wherein said remaining capacity detecting means includes:
   means for fetching said predetermined current;
   means for fetching said battery voltage change;
   means for calculating an active capacity of said battery from said predetermined current and the battery voltage change, based on a predetermined relationship between the active capacity and the battery voltage change of said battery.

3. A power supply according to claim 2, wherein said remaining capacity detecting means further includes:
   means for diagnosing said remaining capacity, in accordance with a predetermined relation between an actually dischargable time of the battery and a ratio of the calculated active capacity to a current of said load.

4. A power supply according to claim 1, further comprising:
   means for charging said battery.

5. A power supply according to claim 4, further comprising:
   means for controlling the charging of said battery in accordance with a predetermined condition, said predetermined condition being selected from a plurality of charging conditions, such that when the battery voltage exceeds a predetermined reference, one of said charging conditions is selected, and when the battery voltage falls under the predetermined reference, another one of said charging conditions is selected.

6. A power supply according to claim 1, wherein said power supply includes:
   a first AC-AC power converter having a first rectifier means for converting input AC power from said external power source into first DC power, and a first inverter means for converting the first DC power into output AC power supplied to said load;
   a second AC-AC power converter having a second rectifier means for converting said input AC power into second DC power, and a second inverter means for converting the second DC power into said output AC power; and
   means for feeding DC power from said battery to each of said first and second inverter means.

7. A power supply according to claim 1, further comprising:
   means for charging said battery by energy obtained from said external power source.

8. A power supply according to claim 7, further comprising:

means for controlling said charging means, such that when the battery voltage exceeds a predetermined reference, a first charging condition is selected, and when the battery voltage falls under the predetermined reference, a second charging condition is selected.

9. A power supply according to claim 1, wherein said power supply includes:
a first power converter having a first rectifier means for converting input AC power from said external power source into first DC power, and a first means for converting the first DC power into output power supplied to said load;
a second power converter having a second rectifier means for converting said input AC power into second DC power, and a second means for converting the second DC power into said output power; and
means for feeding DC power from said battery to each of said first and second means.

10. A power supply apparatus in which when power from an input AC power supply is power-converted by said power supply apparatus and is supplied to a load, even if said input AC power supply fails for a short period of time, power is supplied from a storage battery to the load through a DC circuit of said power supply apparatus, and stable power can be continuously supplied to the load during the power failure, said power supply apparatus comprising:
means for causing said storage battery to supply at least part of power to be supplied to the load for a first predetermined period of time while said input AC power supply is normally operated; and
means for diagnosing a remaining capacity of said storage battery on the basis of a charge which is discharged from said storage battery during the first predetermined period of time;
wherein said means for diagnosing includes means for detecting said remaining capacity of the battery in accordance with a change in the battery voltage when said AC power supply is operating, said change being a difference between an initial voltage of the battery and an active voltage of the battery obtained when the batter is discharged by a predetermined current for a second predetermined period of time.

11. A power supply apparatus according to claim 10, wherein said diagnosing means further comprises means for determining whether said predetermined current is held at a predetermined current value, and for comparing said predetermined current and said change in battery voltage to a battery capacity relationship derived beforehand to determine said remaining capacity.

12. A power supply apparatus in which when power from an input AC power supply is power-converted by said power supply apparatus and is supplied to a load, even if said input AC power supply fails for a short period of time, power is supplied form a storage battery to the load through a DC circuit of said power supply apparatus, and stable power can be continuously supplied to the load during the power failure, said power supply apparatus comprising:
means for controlling said power supply so as to cause said storage battery to supply at least part of power to be supplied to the load for a first predetermined period of time while said input AC power supply is normally operated; and
means for diagnosing a power failure backup time of said storage battery on the basis of a load capacity and a charge which is discharged from said storage battery during the first predetermined period of time;
wherein said means for diagnosing includes means for detecting a remaining capacity of the battery in accordance with a change in the battery voltage when said AC power supply is operating, said change being a difference between an initial voltage of the battery and an active voltage of the battery obtained when the battery is discharged by a predetermined current for a second predetermined period of time.

13. A power supply apparatus according to claim 12, wherein said diagnosing means further comprises means for determining whether said predetermined current is held at a predetermined current value, and for comparing said predetermined current and said change in battery voltage to a battery capacity relationship derived beforehand to determine said remaining capacity.

14. A power supply apparatus in which when an input AC power supply fails, power can be uninterruptibly supplied from a storage battery to a load, comprising:
means for performing an equalizing charge operation of said storage battery for a first predetermined period of time and subsequently switching the equalizing charge operation to a floating charge operation while said input AC power supply is normally operated; and
means for diagnosing a capacity of said storage battery on the basis of a charge which is discharged from said storage battery for a desired period of time when the floating charge operation is performed.
wherein said means for diagnosing include means for detecting a remaining capacity of the battery in accordance with a change in the battery voltage when said AC power supply is operating, said change being a difference between an initial voltage of the battery and an active voltage of the battery obtained when the battery is discharged by a predetermined current for a second predetermined period of time.

15. A power supply apparatus according to claim 14, wherein said diagnosing means further comprises means for determining whether said predetermined current is held at a predetermined current value, and for comparing said predetermined current and said change in battery voltage to a battery capacity relationship derived beforehand to determine said remaining capacity.

16. A power supply apparatus in which when power from an input AC power supply is power-converted by said power supply apparatus and is supplied to a load, even if said input AC power supply fails for a short period of time, power is supplied from a storage battery to the load through a DC circuit of said power supply apparatus, and stable power can be continuously supplied to the load during the power failure, said power supply apparatus comprising:
means for causing said storage battery to supply at least part of power to be supplied to the load for a first predetermined period of time while said input AC power supply is normally operated; and
means for diagnosing a remaining capacity of said storage battery on the basis of a charge which is discharged from said storage battery during the predetermined period of time, thereby automatically performing equalizing charging in accordance with the diagnosis result;

wherein said means for diagnosing include means for detecting a remaining capacity of the battery in accordance with a change in the battery voltage when said AC power supply is operating, said change being a difference between an initial voltage of the battery and an active voltage of the battery obtained when the battery is discharged by a predetermined current for said predetermined period of time.

17. A power supply apparatus according to claim 15, wherein said diagnosing means further comprises means for determining whether said predetermined current is held at a predetermined current value, and for comparing said predetermined current and said change in battery voltage to a battery capacity relationship derived beforehand to determine said remaining capacity.

* * * * *